US010248935B2

(12) United States Patent
DeLuca et al.

(10) Patent No.: US 10,248,935 B2
(45) Date of Patent: *Apr. 2, 2019

(54) SYSTEM AND METHOD FOR PROVIDING A DRIVERLESS PORTABLE ATM

(71) Applicant: Capital One Services, LLC, McLean, VA (US)

(72) Inventors: Brian DeLuca, Midlothian, VA (US); Harish Chavan, Glen Allen, VA (US); Jamie Warder, Bethesda, MD (US); Max Doerfler, III, Richmond, VA (US); William Grisaitis, Arlington, VA (US); Mayank Pande, Glen Allen, VA (US); Robert Kania, Falls Church, VA (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 592 days.

This patent is subject to a terminal disclaimer.

(21) Appl. No.: 14/862,450

(22) Filed: Sep. 23, 2015

(65) Prior Publication Data

US 2016/0078417 A1 Mar. 17, 2016

Related U.S. Application Data

(63) Continuation-in-part of application No. 14/854,404, filed on Sep. 15, 2015.
(Continued)

(51) Int. Cl.
*G06Q 40/00* (2012.01)
*G06Q 20/10* (2012.01)
(Continued)

(52) U.S. Cl.
CPC .......... *G06Q 20/1085* (2013.01); *G01S 5/02* (2013.01); *G01S 19/13* (2013.01); *H04W 4/021* (2013.01)

(58) Field of Classification Search
CPC ............ G06Q 20/1085; G06Q 20/108; G06Q 20/3221
See application file for complete search history.

(56) References Cited

U.S. PATENT DOCUMENTS 4,861,049 A * 8/1989 Losi ..................... G07F 19/20
180/275
5,726,430 A * 3/1998 Ruggirello ............... B60P 3/03
235/379
(Continued)

*Primary Examiner* — Kirsten S Apple
*Assistant Examiner* — Mike Anderson
(74) *Attorney, Agent, or Firm* — Troutman Sanders LLP; Christopher J. Forstner; John A. Morrissett

(57) ABSTRACT

The disclosed technology includes a plurality of driverless mobile automated teller machines (ATMs), a communication interface configured to receive, from a user device, a request for a driverless mobile ATM to complete facilitate a transaction, a location processor configured to determine a first driverless mobile ATM of the plurality of driverless mobile ATMs that is closest to the user device, wherein the communication interface is further configured to transmit, to the first driverless mobile ATM, an alert including the request such that the first driverless mobile ATM can provide cash to a user associated with the user device or can receive cash or a check from the user, and a transaction processor of a backend system of the financial institution configured to process the transaction.

12 Claims, 5 Drawing Sheets

Related U.S. Application Data

(60) Provisional application No. 62/050,353, filed on Sep. 15, 2014.

(51) Int. Cl.
    *H04W 4/021*    (2018.01)
    *G01S 19/13*     (2010.01)
    *G01S 5/02*      (2010.01)

(56) References Cited

U.S. PATENT DOCUMENTS

| | | | | |
|---|---|---|---|---|
| 9,290,927 | B1* | 3/2016 | Sheley | G07F 19/205 |
| 2002/0074394 | A1* | 6/2002 | Birnie | G06Q 20/32 |
| | | | | 235/379 |
| 2010/0059587 | A1* | 3/2010 | Miller | G06Q 20/1085 |
| | | | | 235/379 |
| 2012/0041675 | A1* | 2/2012 | Juliver | G06Q 10/08 |
| | | | | 701/465 |
| 2014/0351125 | A1* | 11/2014 | Miller | G06Q 20/1085 |
| | | | | 705/43 |
| 2015/0356834 | A1* | 12/2015 | Smith | G07F 19/205 |
| | | | | 109/24 |
| 2016/0012403 | A1* | 1/2016 | Kursun | G06Q 20/1085 |
| | | | | 705/44 |
| 2016/0012411 | A1* | 1/2016 | Kursun | G06Q 20/3221 |
| | | | | 705/42 |

* cited by examiner

SYSTEM AND METHOD FOR PROVIDING A DRIVERLESS PORTABLE ATM

CROSS REFERENCE TO RELATED APPLICATIONS

This is a Continuation-in-part of U.S. patent application Ser. No. 14/854,404, filed on Sep. 15, 2015, which claims benefit of U.S. Provisional Patent Application No. 62/050,353, filed on Sep. 15, 2014, the contents of which are incorporated by reference herein in its entirety.

This application contains subject matter related to U.S. Provisional Patent Application No. 61/924,392, filed on Jan. 7, 2014, U.S. Provisional Patent Application No. 61/976,703, filed on Apr. 8, 2014, and U.S. patent application Ser. No. 14/717,550, filed on May 20, 2015, which claims priority to U.S. Provisional Patent Application No. 62/000,666, filed on May 20, 2014, the contents each of which are incorporated by reference herein in their entirety.

FIELD OF THE DISCLOSURE

The present disclosure relates to systems and methods for providing driverless mobile ATM services to a customer. The customer may obtain driverless mobile ATM services from a driverless vehicle-based mobile ATM.

BACKGROUND OF THE DISCLOSURE

Currently, if an individual wishes to obtain cash, that individual must find a physical automatic teller machine (ATM), cash dispenser, or store to withdraw cash. The availability of cash is limited by the availability of nearby ATMs, cash dispensers, and stores, as well as bank branch hours. Furthermore, some ATMs charge unreasonable fees for cash withdrawals. Also, ATMs may be located in unsafe or remote areas, making it difficult for an individual to access cash when he or she needs it.

Further, the world of banking is rapidly changing; the economy and customers require on demand services, and convenience of obtaining those services is also a customer requirement. With smartphones and mobile applications, on demand conveniences can be achieved. However, the need for cash currency will still be present for some time. Additional conveniences customers require for a mobile ATM to be commercially successful are communicating in ways that avoid the long wait times typically experienced when dialing a customer service phone number. Customers demand to request a vehicle, cancel a requested vehicle, request an Americans with Disabilities Act ("ADA") compliant vehicle, receive an estimated time of arrival, track the vehicle, and receive notification when the vehicle has reached its destination. Regarding wait time in today's on demand world, customers also desire to experience the minimum possible wait time.

Existing mobile banking technology experiences problems with network connectivity as it is moving through the city, and experiences delays in use when starting up or if power to the ATM is otherwise interrupted. Loss of power leads to loss of the ability to monitor the ATM for security purposes. Other security concerns include the threat of armed robbery and other criminal activity targeting a live vehicle-based ATM as it travels throughout a city.

Mobile banking technology could face the problem of damage to the ATM components due to the vibrations a vehicle experiences while traveling. Additional technology components also need to be secured to the vehicle.

These and other drawbacks exist.

BRIEF DESCRIPTION OF THE DRAWINGS

Various embodiments of the present disclosure, together with further objects and advantages, may best be understood by reference to the following description taken in conjunction with the accompanying drawings, in the several Figures of which like reference numerals identify like elements, and in which.

DETAILED DESCRIPTION OF THE EMBODIMENTS

Figure 1:
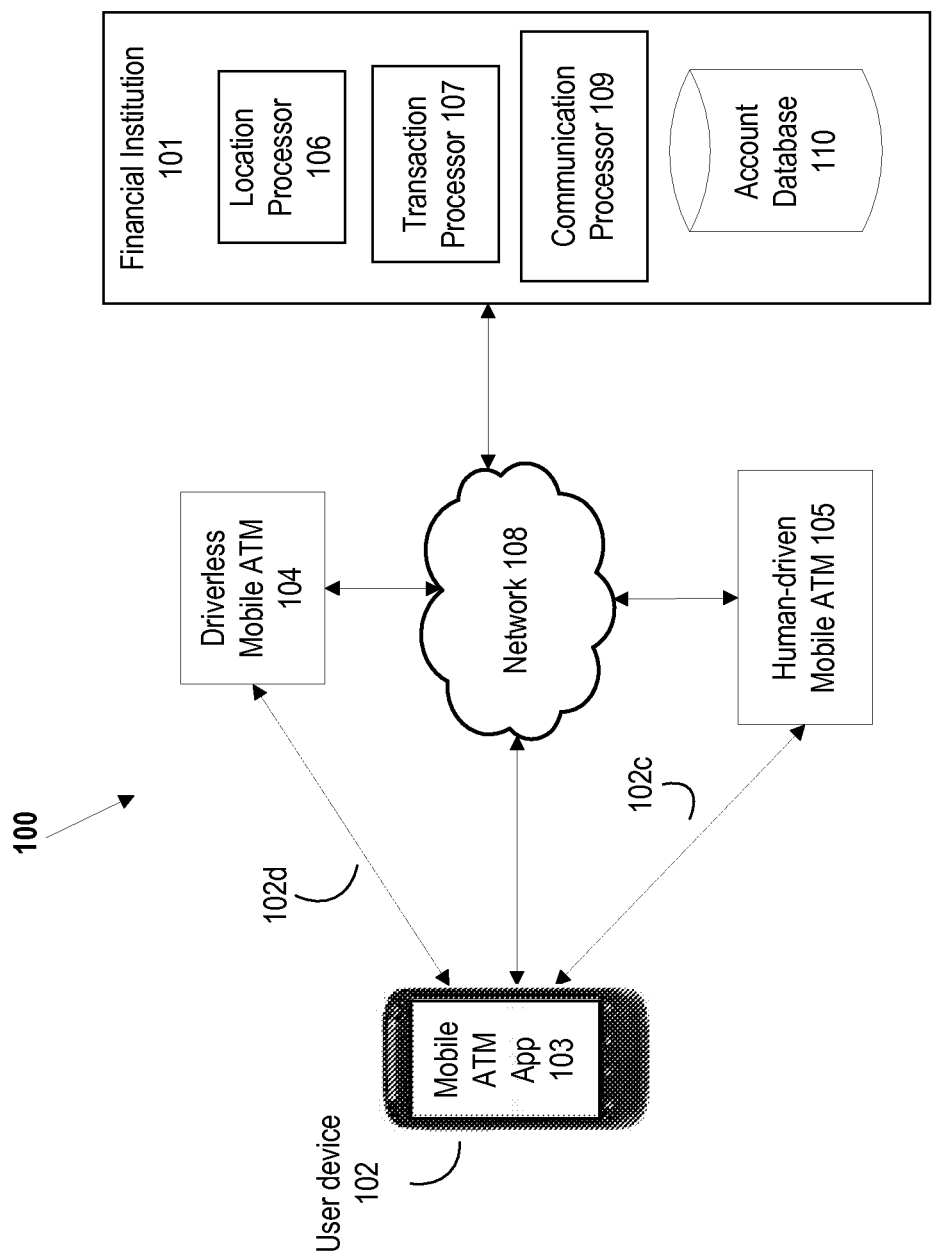
FIG. 1 depicts a schematic diagram of a system for providing a mobile ATM to a user in response to the user's request, according to an example embodiment of the disclosure.

The following description is intended to convey a thorough understanding of the embodiments described by providing a number of specific exemplary embodiments and details involving systems and methods for providing mobile ATMs to a customer in response to the customer's request, via, for example, the systems shown and described herein. It should be appreciated, however, that the present disclosure is not limited to these specific embodiments and details, which are exemplary only. It is further understood that one possessing ordinary skill in the art, in light of known systems and methods, would appreciate the use of the invention for its intended purposes and benefits in any number of alternative embodiments, depending on specific design and other needs. A financial institution and system supporting a financial institution are used as examples for the disclosure. The disclosure is not intended to be limited to financial institutions only.

In various embodiments, a customer may access a mobile banking application on a mobile device and submit a request for a driverless mobile ATM. The request may be transmitted to a backend financial system or similar system that receives the request and enables deployment of a mobile ATM. Although the present disclosure describes the systems and methods used within a mobile banking application, it will be appreciated that a similar mobile optimized website and/or online banking website also may be used. The customer may request a withdrawal and/or deposit, and include the amount to be withdrawn or deposited. The customer request may include the customer's name, contact information, account number, and the current date and time. The request may include the customer's current location and/or a location where the customer would like to meet the driverless mobile ATM. The request may include a specific time at which the customer would like to meet the driverless mobile ATM.

In various embodiments, the driverless mobile ATM is in a vehicle with a generator equipped with a continuous source of power for the ATM, even when the vehicle is moving. The continuous source of power may be a generator on-board the vehicle. The continuous source of power allows the mobile ATM to always be on when the vehicle is on the road, even if the vehicle is turned off. This eliminates the need for ATM start-up time, reducing the time it takes for a customer to use the ATM, and also assists in continuously monitoring the performance of the ATM. The driverless vehicle mobile ATM may also be equipped with cameras, a remote disable option, and GPS tracking to monitor the mobile ATM and provide additional security. The vehicle may have a power switchover so that the power source may transition, without interruption, from an on-board generator to a wall outlet. The power switchover ensures that the mobile ATM is always live and does not have a disruption of power.

It should be appreciated that the connectivity, power generator, and security features described herein above may also be present in a human-driven vehicle-based mobile ATM and in a mobile ATM located within an ADA accessible vehicle.

The driverless vehicle-based mobile ATM may have a dual band router. The dual band router may have a first band for use with a first mobile internet service provider, and a second band for use with a second mobile internet service provider. The dual band connectivity may ensure that there will be less risk of no connectivity of the driverless mobile ATM at different points throughout a city where the driverless mobile ATM is based.

The driverless mobile ATM may have vibration-reduction elements in place. The driverless mobile ATM may have a solid steel plate installed at the bottom of the ATM component to reduce vibrations of the ATM components. The driverless mobile ATM may have a solid state hard drive to lessen its susceptibility to vibration. Further, the driverless vehicle housing the mobile ATM may have secure shelves within it to maintain the power source, router, and any other ATM-related components in a constant position while the vehicle is in motion. In another embodiment, the ATM may be integrated into the design of the vehicle. In yet another embodiment, the mobile ATM may be welded into the vehicle.

Figure 5:
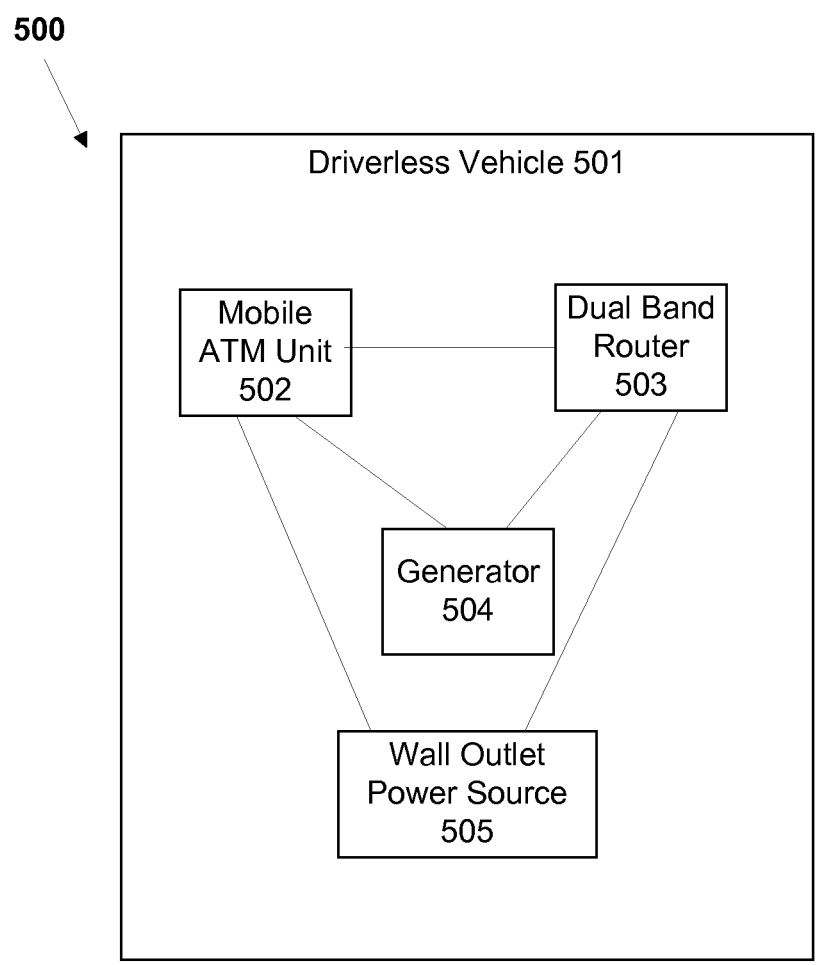
FIG. 5 depicts a schematic diagram of a driverless vehicle-based mobile ATM with its internal components, according to an example embodiment of the disclosure.

FIG. 5 depicts an exemplary embodiment of a system 500 of a driverless vehicle-based mobile ATM. The system 500 includes a vehicle which may operate on driverless technology. The system may also include a mobile ATM unit 502. The mobile ATM unit 502 may be installed by welding or other installation means. The mobile ATM unit 502 may be integrated directly into the driverless vehicle 501. System 500 may contain a dual band router 503 secured within driverless vehicle 501. The dual band router 503 is in communication with mobile ATM unit 502. The communication may be hard-wired or may be wireless. The system 500 may contain a generator 504 secured within driverless vehicle 501, and connected in such a way as to provide power to the dual band router 503 and the mobile ATM unit 502. System 500 may also contain wall outlet power source 505 which contains a plug designed to fit into a wall electrical outlet. Wall outlet power source 505 may be secured within the driverless vehicle 501. Wall outlet power source may be connected to both the dual band router 503 and the mobile ATM unit 502, which when plugged into a wall may provide power to the dual band router 503 and mobile ATM unit 502. The mobile ATM unit 502, the dual band router 503 and/or the generator 504 may be secured to shelves (not pictured) within the driverless vehicle 501.

In various example embodiments, various location services on a mobile device may be used to determine the customer's location. For example, a mobile device may use information from cellular, Wi-Fi, Global Positioning System (GPS) networks and/or iBeacons or other similar devices to determine an approximate location. The mobile device may, for example, periodically send the geo-tagged location of nearby Wi-Fi hotspots and cell towers in an anonymous and/or encrypted form to an aggregator that may improve location accuracy. Where, for example, the mobile device is an Apple® device (e.g., an iPhone™, iPad™, iPod™, smart watch, etc.) the Core Location framework may be used to receive and monitor the current location of the mobile device. For example, a mobile banking application may link to Core Location framework in an Xcode project to enable the mobile banking application to locate the current position of the device. Where for example, the mobile device is running the Google® Android™ platform, the ACCESS COARSE LOCATION and FINE strings may be used by the mobile banking application to obtain the location of the mobile device.

The request, which may include location information, may be transmitted over a network to one or more servers, which may locate a nearby driverless vehicle-based mobile ATM that is proximate to the customer's current location (e.g., using similar techniques as described herein). In one embodiment, the mobile ATM may be a driverless vehicle-based ATM. In another embodiment, the mobile ATM may be in a human driven vehicle. In another embodiment, the mobile ATM may be in an ADA compliant vehicle. In yet another embodiment, the user may use the mobile banking application to specifically request an ADA compliant vehicle. In another embodiment, the user may use the mobile banking application to choose either a driverless vehicle-based mobile ATM or a human driven vehicle-based mobile ATM, and may request that the driverless mobile ATM or human driven mobile ATM be ADA compliant. The one or more servers may notify the vehicle-based ATM of the user's request, and a response may be sent to the customer's mobile device. The response may include a unique identifier for the driverless vehicle-based mobile ATM, an estimated arrival time, and the ATM's current location. The response may include a tracker, allowing the customer to track the location of the driverless vehicle-based mobile ATM. The user may cancel the request for a vehicle-based mobile ATM at any time through the mobile web application. The driverless vehicle-based mobile ATM may become mobile and relocate to the customer's location (or a nearby location), and the customer may receive an alert when the ATM has arrived. The alert may be in the form of a push notification provided by the mobile application. The customer may then withdraw and/or deposit cash or checks at the driverless vehicle-based mobile ATM, and conduct any other transactions which typically occur at ATMs.

The request may also be transmitted over a network to one or more servers, which may locate a nearby vehicle-based mobile ATM which is a driven by a human and that is proximate to the customer's current location, using techniques as described herein. The one or more servers may notify the vehicle-based mobile ATM of the customer's request, and a response may be sent to the customer's mobile device. The response may include a unique identifier for the vehicle-based mobile ATM, an estimated arrival time, the ATM's current location. The response may include a tracker, allowing the customer to track the location of the vehicle-based mobile ATM. The vehicle-based mobile ATM may be driven to the customer's location (or a nearby location), and the customer may receive an alert when the ATM has arrived. The customer may then withdraw and/or deposit cash or checks at the driverless vehicle-based ATM.

In various embodiments, a customer may access a mobile banking application on a mobile device and submit a request for a mobile ATM. The customer may request a withdrawal or deposit, and include the amount to be withdrawn/deposited. The customer request may include the customer's name, contact information, account number, and the current date and time. The request may include the customer's current location and/or a location where the customer would like to meet the mobile ATM. The mobile ATM may be a driverless vehicle-based mobile ATM or it may be a vehicle-based mobile ATM that is driven by a human. The mobile ATM may be an ADA compliant vehicle. In another embodiment, the customer may use the mobile ATM application to choose which type of vehicle-based mobile ATM the customer prefers. In another embodiment, the user may use the mobile banking application to choose either a driverless vehicle-based mobile ATM or a human driven vehicle-based mobile ATM, and may request that the driverless mobile ATM or human driven mobile ATM be ADA compliant. Customers who prefer the fastest available mobile ATM may choose any option; customers who prefer driverless mobile ATMs may designate a driverless mobile ATM as the first choice, and those who prefer to communicate with a human driver may choose a human-driven mobile ATM.

The financial institution may have set up a temporary account for transfers associated with the ATM application. The financial institution may execute a transaction by debiting/crediting the customer's account to the temporary account in the amount of the withdrawal/deposit upon receiving a confirmation from the customer that the transaction has taken place.

FIG. 1 depicts an example embodiment of a system 100 for providing a driverless mobile ATM to a customer in response to the customer's request, according to various embodiments of the disclosure. The system 100 may include various network-enabled computer systems, including, as depicted in FIG. 1 for example, a financial institution 101 (comprising location processor 106, transaction processor 107, communication processor 109, and account database 110), user device 102, driverless mobile ATM 104, and network 108. Mobile ATM 104 may be located within a vehicle driven by a driver. In another instance, mobile ATM may be a human-driven vehicle-based mobile ATM 105. It is also noted that the system 100 illustrates only a single instance of each component. It will be appreciated that multiple instances of these components may be used. For example, various embodiments may include a plurality of user devices 102, driverless mobile ATMs 104, and/or human driven mobile ATMs 105. Moreover, the system 100 may include other devices not depicted in FIG. 1.

In various example embodiments, location processor 106, transaction processor 107, communication processor 109, and/or account database 110 may be stand-alone components, or combined separately from financial institution 101. Each processor may comprise one or more network-enabled computers. As referred to herein, a network-enabled computer system and/or device may include, but is not limited to: e.g., any computer device, or communications device including, e.g., a server, a network appliance, a personal computer (PC), a workstation, a mobile device, a phone, a handheld PC, a personal digital assistant (PDA), a thin client, a fat client, an Internet browser, or other device. The network-enabled computer systems may execute one or more software applications to, for example, receive data as input from an entity accessing the network-enabled computer system, process received data, transmit data over a network, and receive data over a network. The one or more network-enabled computer systems may also include one or more software applications, such as mobile ATM application 103, to enable a user of user device 102 to request a driverless mobile ATM 104 or a mobile ATM 105 from financial institution 101. In various embodiments, mobile ATM application 103 may be integrated into a native mobile banking application and/or a mobile optimized web site associated with financial institution 101, for example. The functionality of mobile ATM application 103 also may be integrated into an online banking website.

The components depicted in FIG. 1 may store information in various electronic storage media, such as account database 110. Electronic information, files, and documents may be stored in various ways, including, for example, a flat file, indexed file, hierarchical database, relational database, such as a database created and maintained with software from, for example, Oracle® Corporation, a Microsoft® SQL system, an Amazon cloud hosted database or any other query-able structured data storage mechanism.

The components depicted in FIG. 1 may be coupled via one or more networks, such as, for example, network 108. Network 108 may be one or more of a wireless network, a wired network or any combination of wireless network and wired network. For example, network 108 may include one or more of a fiber optics network, a passive optical network, a cable network, an Internet network, a satellite network, a wireless LAN, a Global System for Mobile Communication ("GSM"), a Personal Communication Service ("PCS"), a Personal Area Network ("PAN"), D-AMPS, Wi-Fi, Fixed Wireless Data, IEEE 802.11b, 802.15.1, 802.11n and 802.11g or any other wired or wireless network for transmitting and receiving a data signal. Network 108 may comprise one or more secure communication channels for securely exchanging information between requestor device 102a, dispenser device 102b, and financial institution 101.

In addition, network 108 may include, without limitation, telephone lines, fiber optics, IEEE Ethernet 902.3, a wide area network ("WAN"), a local area network ("LAN"), or a global network such as the Internet. Also network 108 may support an Internet network, a wireless communication network, a cellular network, or the like, or any combination thereof. Network 108 may further include one network, or any number of the example types of networks mentioned above, operating as a stand-alone network or in cooperation with each other. Network 108 may utilize one or more protocols of one or more network elements to which they are communicatively coupled. Network 108 may translate to or from other protocols to one or more protocols of network devices. Although network 108 is depicted as a single network, it should be appreciated that according to one or more embodiments, network 108 may comprise a plurality of interconnected networks, such as, for example, the Internet, a service provider's network, a cable television network, corporate networks, and home networks.

In various example embodiments, user device 102 may be associated with any individual or entity that desires to withdraw cash and/or deposit cash using an ATM associated with financial institution 101. Financial institution 101 may be, for example, a bank, other type of financial institution, including a credit card and/or debit card provider, for example, or any other entity that offers accounts to customers. An account may include any place, location, object, entity, or other mechanism for holding money or performing transactions in any form, including, without limitation, electronic form. An account may be, for example, a credit card account, a prepaid card account, stored value card account, debit card account, check card account, payroll card account, gift card account, prepaid credit card account, charge card account, checking account, rewards account, line of credit account, credit account, mobile device account, an account or service that links to an underlying payment account already described, or mobile commerce account. An account may or may not have an associated card, such as, for example, a credit card for a credit account or a debit card for a debit account. The account may enable payment using biometric authentication, or contactless based forms of authentication, such as QR codes or near-field communications. The account card may be associated or affiliated with one or more social networking sites, such as a co-branded credit card.

User device 102 may be, for example, a handheld PC, a phone, a smartphone, a PDA, a tablet computer, or other device. User device 102 may include an iPhone™, iPod™, iPad™ from Apple® or any other mobile device running Apple®'s iOS operating system, any device running Google®'s Android™ operating system, including for example, Google®'s wearable device, Google Glass™, any device running Microsoft®'s Windows® Mobile operating system, and/or any other smartphone or like wearable mobile device (e.g., smart watch). Device 102 may include device-to-device communication abilities (shown as elements 102c and 102d). Elements 102c and 102d may include RFID transmitters and receivers, cameras, scanners, and/or Near Field Communication (NFC) capabilities, which may allow for communication with other devices by touching them together or bringing them into close proximity. Exemplary NFC standards include ISO/IEC 18092:2004, which defines communication modes for Near Field Communication Interface and Protocol (NFCIP-1). For example, device 102 may be configured using the Isis Mobile Wallet™ system, which is incorporated herein by reference. Other exemplary NFC standards include those created by the NFC Forum. Elements 102c and 102d may use Bluetooth technology built into device 102. Elements 102c and 102d may use iBeacon technology and/or Bluetooth Low Energy (BLE) capabilities.

User device 102 may include one or more software applications, such as mobile ATM application 103. Mobile ATM application 103 may be a software application that enables user device 102 to securely exchange data with, network 108, financial institution 101, driverless mobile ATM 104, mobile ATM 105, location processor 106, transaction processor 107, communication processor 109, and/or account database 110. Mobile ATM application 103 may provide one or more graphical user interfaces for the users of device 102 to locate a driverless mobile ATM 104 and/or mobile ATM 105 and withdraw or deposit cash and/or checks. Mobile ATM application 103 may be, for example, a native application that executes on a mobile device. Mobile ATM application 103 may also be integrated into, for example, a native mobile banking application, a mobile optimized web site, and/or a standard web browser-compatible online banking website that allows the user of user device 102 to access an account with financial institution 101. Mobile ATM application 103 may interact with one or more application programming interfaces (APIs) on mobile device 102 that enable location information to be provided to mobile ATM application 103.

The user of device 102 may have one or more accounts with financial institution 101. The user of device 102 may use Mobile ATM application 103 to link or otherwise associate an account to transaction processor 107 and allow transaction processor 107 to use the account for digital payments in exchange for the user being able to receive and/or deposit cash from a driverless mobile ATM 104. The user of user device 102 may log into his online account via mobile ATM application 103. The login may include a username and password. Transaction processor 107 may receive the username and password over network 108 and compare them to login information associated with accounts stored in database 110. If a match is found, transaction processor 107 may grant the user access to his account (or accounts) in account database 110 via mobile ATM application 103.

The user of device 102 may use Mobile ATM application 103 to link his account to transaction processor 107 and allow transaction processor 107 to use the account for digital payments in exchange for the user being able to receive and/or deposit cash from a mobile ATM 105 in a driver-operated vehicle. In steps similar to that above when a user allow transaction processor 107 to use the account for digital payments in exchange for the user being able to receive and/or deposit cash, a transaction processor 107 may grant the user access to his account (or accounts) in account database 110 via mobile ATM application 103.

The user may select a "Driverless Mobile ATM" feature on, for example, the interface provided by mobile ATM application 103. The user may desire to withdraw and/or deposit cash using a driverless mobile ATM 104 and/or a mobile ATM 105 associated with financial institution 101. Mobile ATM application 103 may provide an interface to user device 102 allowing the user to make a request for a withdrawal/deposit. Mobile application 103 may query the user whether to withdraw cash or deposit cash. Mobile application 103 may query whether the user wants a driverless mobile ATM 104 or a human-driven mobile ATM 105. If the user selects "withdraw cash," mobile application 103 may prompt the user to enter the amount he withdraw. If the user selects "deposit cash", mobile application 103 may prompt the user to enter the amount to deposit. In various embodiments, transaction processor 107 may automatically only search for mobile ATMs based on the amount of the requested withdrawal/deposit. For example, if the withdrawal/deposit amount exceeds $500, transaction processor 107 may automatically limit the search to driverless mobile ATMs. The user may include a time window for meeting the mobile ATM (e.g., the user may request a mobile ATM within the next 30 minutes).

Driverless mobile ATM 104 may be an automatic-teller machine and/or cash dispenser and/or the like that is vehicle-based. Driverless mobile ATM 104 may be associated with financial institution 101. Driverless mobile ATM 104 may comprise a vehicle that is outfitted with a portable ATM. The ATM may be integrated into the vehicle. Driverless mobile ATM 104 may be a truck or a van or other similar moving vehicle in a manner that enables secure transportation and utilization of an ATM. Driverless mobile ATM 104 may be driven by an employee of financial institution 101. Driverless mobile ATM may operates on driverless vehicle technology. Driverless mobile ATM 104 may maintain a secure connection with financial institution 101, location processor 106, transaction processor 107, communication processor 109, and/or account database 110. For example, driverless mobile ATM may include one or more wireless connections (e.g., a primary and backup network connection) that provides a stable connection and maximizes connectivity of driverless mobile ATM 104. A user may be able to approach driverless mobile ATM 104 and physically deposit or withdraw cash from driverless mobile ATM 104 in the same way the user would using a stationary ATM or cash dispenser, for example. Deposits and withdrawals at driverless mobile ATM 104 may be reconciled with accounts associated with financial institution 101 on a regular basis in the same or similar way that deposits and withdrawals at a stationary ATM would be.

Financial institution 101 may receive the request from user device 102. In various embodiments, the request may be transmitted via a network using, for example, a secure connection established between the mobile ATM application and a backend financial institution. The request may include identification information, such as, the name of the user associated with user device 102. The request also may include a contact number associated with user device 102. The request may include the amount of the withdrawal/deposit. The request may include whether the user wants a driverless mobile ATM or a human-driven mobile ATM. The request may include location data from user device 102. The request may include a time window and/or time of day when the user would like to meet the driverless mobile ATM or human-driven mobile ATM. The location data may be GPS coordinates and/or a physical address indicating the current location of user device 102. The location data may be GPS coordinates and/or a physical address indicating the location where the user of user device 102 would like to receive cash. For example, the user may indicate that he wants to meet the driverless mobile ATM at a nearby Starbucks and provide the address for the Starbucks. The user may use the interface of mobile ATM application 103 to "drop a pin" (using a mobile device interface) at a location where he wants to meet the driverless mobile ATM and/or mobile ATM. In various embodiments, location processor 106 may automatically pull location data from user device 102 (using, for example, the hardware and software described above) in response to financial institution 101 receiving a request for a driverless mobile ATM from user device 102. The request may include account information associated with one or more accounts held by the user of user device 102 at financial institution 101. The account information may include an account number, routing number, etc.

Location processor 106 may search for driverless mobile ATMs 104 that are within a certain distance of the location associated with the location data from user device 102. Location processor 106 may constantly receive updated location data from driverless mobile ATM 104. Location processor 106 also may maintain the status of each driverless mobile ATM 104 within a fleet, including, for example, the amount of cash available to dispense by each mobile ATM. Location processor 106 may search for a driverless mobile ATM 104 that is closest to the location data from user device 102 by comparing location data from user device 102 with location data from driverless mobile ATM 104. If the customer specifically requested a driverless mobile ATM, location processor 106 may only search for driverless mobile ATMs and not mobile ATMs in a human-driven vehicle.

In an example embodiment, location processor 106 may search for mobile ATMs that are within a predetermined distance of the location data from user device 102. The predetermined distance may be based on the location of user device 102. For example, if user device 102 is in a rural area, the predetermined distance may be larger (e.g., 20 miles) than if user device 102 is in an urban area (where the predetermined distance may be 5 miles based on the assumption that there are more driverless mobile ATMs and human-driven mobile ATMs in the urban area). The predetermined distance also may be based on time to travel to user device 102, which may, for example, factor in traffic time and other external factors. Location processor 106 may compare the time window in the request with an estimated time it would take for the mobile ATM to reach the customer location.

In one example, location processor 106 may discover driverless mobile ATM 104 is closest to user device 102, only 2 miles away. Location processor 106 may query the mobile ATM system to determine whether the driverless mobile ATM has the requested cash. If so, communication processor 109 may transmit an alert to driverless mobile ATM 104 that includes the request from user device 102. The alert may include the location data from user device 102, the amount of the requested withdrawal/deposit, and identification information associated with the user (e.g., a picture or photograph of the user). The operating system associated with mobile ATM 104 may respond to the alert affirmatively, indicating that he will drive to the location associated with user device 102. In a driverless vehicle with a mobile ATM 104, a response to the alert will be generated by the operating system associated with the mobile ATM 104. The response may include an estimated time that it will take driverless mobile ATM 104 to meet the user of user device 102. The estimated time may be automatically computed by location processor 106 based on the time of day, the traffic conditions, the road conditions, and the respective locations of driverless mobile ATM 104 and the location data from user device 102. The driverless mobile ATM may respond negatively, indicating that the request is not able to be fulfilled. If the driverless mobile ATM responds negatively, location processor 106 may continue to search for another mobile ATM. In this example, multiple vehicles will not be able to simultaneously accept a user's request. The operating system of the driverless mobile ATM may propose a different location, which may be sent to the user as an alert. In an alternative embodiment, the human-driven mobile ATM 105 operates in a similar manner.

If the generated response or driver responds affirmatively, communication processor 109 may send an alert to user device 102 indicating that driverless mobile ATM 104 will fulfill the request. The alert may include identifying information associated with driverless mobile ATM 104 (e.g., a picture of the driver, the type of vehicle, the color, the license plate number, etc.). The alert may include the estimated time it will take driverless mobile ATM 104 to arrive at the specified location. The alert may include the current location of driverless mobile ATM 104. Driverless mobile ATM application 103 may allow the user of user device 102 to track the current location of driverless mobile ATM 104 while the user waits for driverless mobile ATM 104 to arrive. Communications processor 109 may allow user device 102 to exchange messages with driverless mobile ATM 104. As used herein, a message and/or an alert may be in the form of a text message, SMS, MMS, Tweet (and/or other social media forms of communication), in-app message (e.g., a message within mobile ATM app 103), an email, a phone call, or other electronic form of communication.

When driverless mobile ATM 104 arrives at the location specified by the user of user device 102, the user may interact with driverless mobile ATM 104 to, for example, withdraw and/or deposit the cash or check. The user may use a card issued by financial institution 101 to use the mobile ATM in the same way the user would use the card at a stationary ATM. The user may present identification to the driver or other employee associated with driverless mobile ATM 104. Following the transaction, the user may use driverless mobile ATM application 103 to "rate" the transaction, the quality of service, etc. In an embodiment where the mobile ATM is driven by a human, the user may rate the driver.

In various embodiments, multiple user devices may transmit a request for a driverless mobile ATM and/or a human-driven mobile ATM. Each request may include location data associated with the user devices' requests. Location processor 106 may receive the multiple requests and determine a central location based on the location data associated with each request. Location processor 106 may find a driverless mobile ATM 104 and/or a human-driven mobile ATM 105 that is closest to the central location and send an alert to determine whether the driverless mobile ATM 104 and/or a human-driven mobile ATM 105 is available to travel to the central location and if the driverless mobile ATM 104 and/or a human-driven mobile ATM 105 has cash available to meet the multiple requests. If the driverless mobile ATM 104 and/or a human-driven mobile ATM 105 responds affirmatively, communications processor 109 may transmit an alert to each user device with the location data for the central location. The alert may include a message informing each user device to travel to the central location and be there at a certain time to meet the driverless mobile ATM 104 and/or a human-driven mobile ATM 105. In various embodiments, location processor 106, transaction processor 107 and/or communication processor 109 may schedule a mobile ATM 104 and/or driverless mobile ATM 105 to travel on a route that includes multiple customer locations based on receiving multiple customer requests. The route may be scheduled based on the amount of time each customer requests to receive the cash (e.g., location processor 106 may schedule driverless mobile ATM 104 to meet customer A before customer B, where customer A would like cash in 10 minutes, while customer B would like cash in 15 minutes). Location processor 106 may update the route based on receiving a new customer request while the driverless mobile ATM is in the process of following the route to meet other customers. If the customer location falls on the predetermined route and he needs the cash when the vehicle is passing near him/her, location processor 106 can prioritize that customer.

In various embodiments, driverless mobile ATM 104 and/or a human-driven mobile ATM 105 may provide other banking services (e.g., check cashing, new debit card, cashier's check) in response to a request from user device 102. For example, the user associated with user device 102 may use mobile ATM application 103 to request a driverless mobile ATM 104 to cash a check or receive a new debit card. The process for locating a driverless mobile ATM 104 and/or a human-driven mobile ATM 105 and facilitating the interaction between it and the user device may be similar to the process described above.

In various embodiments, driverless mobile ATM 104 and/or a human-driven mobile ATM 105 may communicate with location processor 106, transaction processor 107, and/or communication processor 109 via one or more network-enabled computers that are integrated with driverless mobile ATM 104 and/or a human-driven mobile ATM 105. The driverless mobile ATM may be a driverless vehicle such as a driverless car. The driverless mobile ATM 104 and/or a human-driven mobile ATM 105 may autonomously drive to a location to meet a customer, based on the process described above. When not in use, location processor 106, transaction processor 107, and/or communication processor 109 may direct the driverless vehicle to a location that is associated with areas of high demand (based on past customer requests for driverless mobile ATMs and/or a human-driven mobile ATMs).

Figure 2:
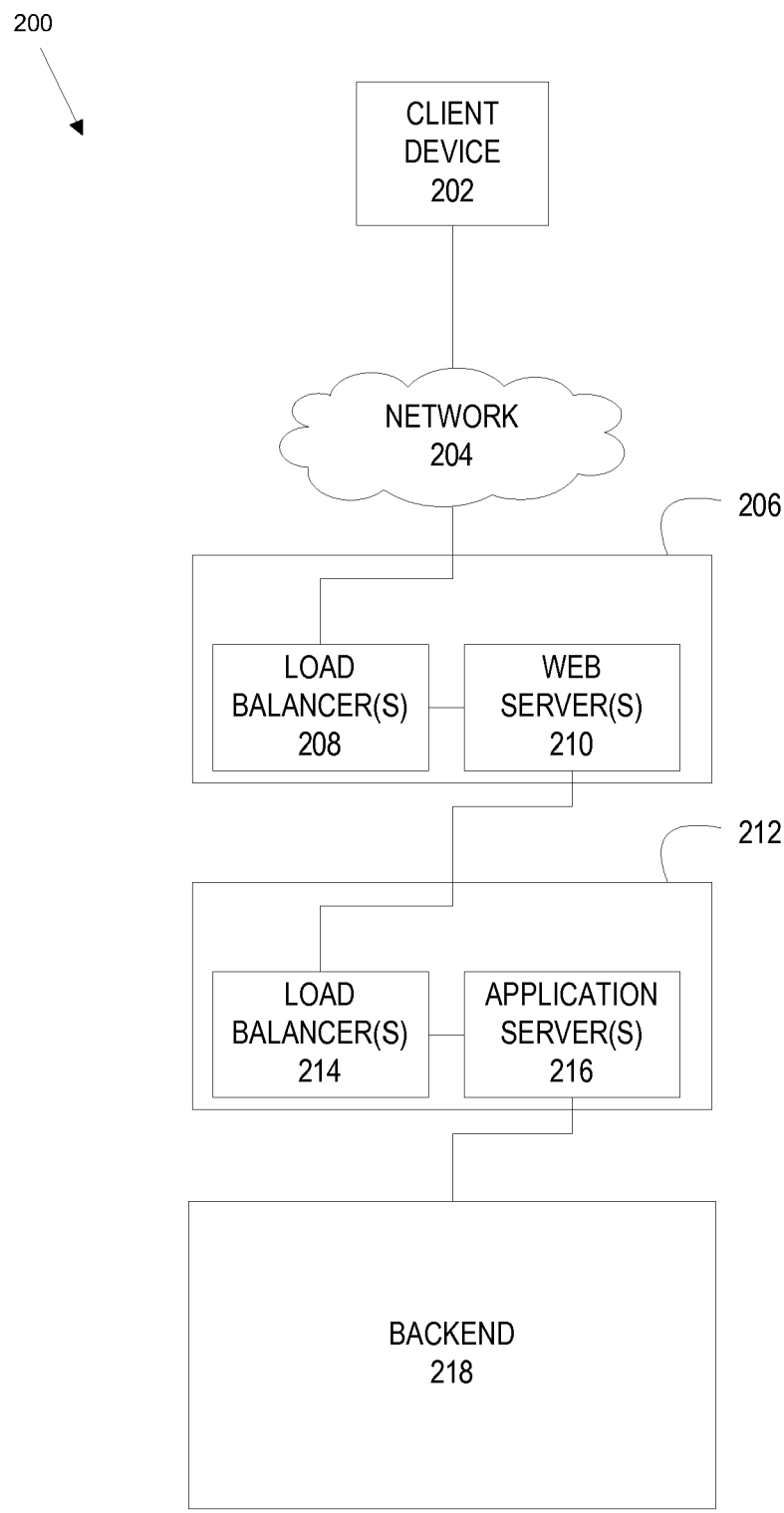
FIG. 2 depicts a schematic diagram of a system for providing a mobile ATM to a user in response to the user's request, according to an example embodiment of the disclosure.

FIG. 2 depicts an example system 200 that provides a driverless mobile ATM to a user based on the user's request. As shown in FIG. 2, system 200 may include a client device 202, a network 204, a front-end controlled domain 206, a back-end controlled domain 212, and a backend 218. Front-end controlled domain 206 may include one or more load balancers 208 and one or more web servers 210. Back-end controlled domain 212 may include one or more load balancers 214 and one or more application servers 216.

Client device 202 may be a network-enabled computer. Client device 202 may be similar to user device 102. Client device 202 may be configured to execute mobile ATM application 103. As referred to herein, a network-enabled computer may include, but is not limited to: e.g., any computer device, or communications device including, e.g., a server, a network appliance, a personal computer (PC), a workstation, a mobile device, a phone, a handheld PC, a personal digital assistant (PDA), a thin client, a fat client, an Internet browser, or other device. The one or more network-enabled computers of the example system 200 may execute one or more software applications to enable, for example, network communications.

Client device 202 also may be a mobile device: For example, a mobile device may include an iPhone™, iPod™, iPad™ from Apple® or any other mobile device running Apple®'s iOS operating system, any device running Google®'s Android™ operating system, including for example, Google®'s wearable device, Google Glass™, any device running Microsoft®'s Windows® Mobile operating system, and/or any other smartphone or like wearable mobile device.

Network 204 may be one or more of a wireless network, a wired network, or any combination of a wireless network and a wired network. For example, network 204 may include one or more of a fiber optics network, a passive optical network, a cable network, an Internet network, a satellite network, a wireless LAN, a Global System for Mobile Communication (GSM), a Personal Communication Service (PCS), a Personal Area Networks, (PAN), D-AMPS, Wi-Fi, Fixed Wireless Data, IEEE 802.11b, 802.15.1, 802.11n, and 802.11g or any other wired or wireless network for transmitting and receiving a data signal.

In addition, network 204 may include, without limitation, telephone lines, fiber optics, IEEE Ethernet 902.3, a wide area network (WAN), a local area network (LAN) or a global network such as the Internet. Also, network 110 may support an Internet network, a wireless communication network, a cellular network, or the like, or any combination thereof. Network 204 may further include one network, or any number of example types of networks mentioned above, operating as a stand-alone network or in cooperation with each other. Network 204 may utilize one or more protocols of one or more network elements to which they are communicatively coupled. Network 204 may translate to or from other protocols to one or more protocols of network devices. Although network 204 is depicted as a single network, it should be appreciated that according to one or more embodiments, network 204 may comprise a plurality of interconnected networks, such as, for example, the Internet, a service provider's network, a cable television network, corporate networks, and home networks.

Front-end controlled domain 206 may be implemented to provide security for backend 218. Load balancer(s) 208 may distribute workloads across multiple computing resources, such as, for example computers, a computer cluster, network links, central processing units or disk drives. In various embodiments, load balancer(s) 208 may distribute workloads across, for example, web server(s) 210 and/or backend 218 systems. Load balancing aims to optimize resource use, maximize throughput, minimize response time, and avoid overload of any one of the resources. Using multiple components with load balancing instead of a single component may increase reliability through redundancy. Load balancing is usually provided by dedicated software or hardware, such as a multilayer switch or a Domain Name System (DNS) server process.

Load balancer(s) 208 and 214 may include software that monitoring the port where external clients, such as, for example, client device 202, connect to access various services of a financial institution or third party that provides the driverless mobile ATM services (such as system 100 shown in FIG. 1), for example. Load balancer(s) 208 may forward requests to one of the application servers 216 and/or backend 218 servers, which may then reply to load balancer 208. This may allow load balancer(s) 208 to reply to client device 202 without client device 202 ever knowing about the internal separation of functions. It also may prevent client devices from contacting backend servers directly, which may have security benefits by hiding the structure of the internal network and preventing attacks on backend 218 or unrelated services running on other ports, for example.

A variety of scheduling algorithms may be used by load balancer(s) 208 to determine which backend server to send a request to. Simple algorithms may include, for example, random choice or round robin. Load balancers 208 also may account for additional factors, such as a server's reported load, recent response times, up/down status (determined by a monitoring poll of some kind), number of active connections, geographic location, capabilities, or how much traffic it has recently been assigned.

Load balancers 208 may be implemented in hardware and/or software. Load balancer(s) 208 may implement numerous features, including, without limitation: asymmetric loading; Priority activation: SSL Offload and Acceleration; Distributed Denial of Service (DDoS) attack protection; HTTP compression; TCP offloading; TCP buffering; direct server return; health checking; HTTP caching; content filtering; HTTP security; priority queuing; rate shaping; content-aware switching; client authentication; programmatic traffic manipulation; firewall; intrusion prevention systems.

Web server(s) 210 may include hardware (e.g., one or more computers) and/or software (e.g., one or more applications) that deliver web content that can be accessed by, for example a client device (e.g., client device 202) through a network (e.g., network 204), such as the Internet. In various examples, web servers, may deliver web pages, relating to, for example, online banking applications and the like, to clients (e.g., client device 202). Web server(s) 210 may use, for example, a hypertext transfer protocol (HTTP or sHTTP) to communicate with client device 202. The web pages delivered to client device may include, for example, HTML documents, which may include images, style sheets and scripts in addition to text content.

A user agent, such as, for example, a web browser, web crawler, or native mobile application, may initiate communication by making a request for a specific resource using HTTP and web server 210 may respond with the content of that resource or an error message if unable to do so. The resource may be, for example a file on stored on backend 218. Web server(s) 210 also may enable or facilitate receiving content from client device 202 so client device 202 may be able to, for example, submit web forms, including uploading of files.

Web server(s) also may support server-side scripting using, for example, Active Server Pages (ASP), PHP, or other scripting languages. Accordingly, the behavior of web server(s) 210 can be scripted in separate files, while the actual server software remains unchanged.

Load balancers 214 may be similar to load balancers 208 as described above.

Application server(s) 216 may include hardware and/or software that is dedicated to the efficient execution of procedures (e.g., programs, routines, scripts) for supporting its applied applications. Application server(s) 216 may comprise one or more application server frameworks, including, for example, Java application servers (e.g., Java platform, Enterprise Edition (Java EE), the .NET framework from Microsoft®, PHP application servers, and the like). The various application server frameworks may contain a comprehensive service layer model. Also, application server(s) 216 may act as a set of components accessible to, for example, a financial institution or other entity implementing system 200 and/or system 100, through an API defined by the platform itself. For Web applications, these components may be performed in, for example, the same running environment as web server(s) 210, and application servers 216 may support the construction of dynamic pages. Application server(s) 216 also may implement services, such as, for example, clustering, fail-over, and load-balancing. In various embodiments, where application server(s) 216 are Java application servers, the web server(s) 210 may behave like an extended virtual machine for running applications, transparently handling connections to databases associated with backend 218 on one side, and, connections to the Web client (e.g., client device 202) on the other.

Backend 218 may include hardware and/or software that enables the backend services of, for example, a financial institution or other entity that maintains a distribution system similar to system 200 and/or system 100. For example, backend 218 may include, a system of record, online banking applications, a rewards platform, a payments platform, a lending platform, including the various services associated with, for example, auto and home lending platforms, a statement processing platform, one or more platforms that provide mobile services, one or more platforms that provide online services, a card provisioning platform, a general ledger system, a mobile ATM system (e.g., system 100 shown in FIG. 1) and the like. Backend 218 may be associated with various databases, including account databases that maintain, for example, customer account information, product databases that maintain information about products and services available to customers, content databases that store content associated with, for example, a financial institution, and the like. Backend 218 also may be associated with one or more servers that enable the various services provided by system 200. Backend 218 may be associated with one or more servers that enable the various services provided by system 100.

Figure 3:
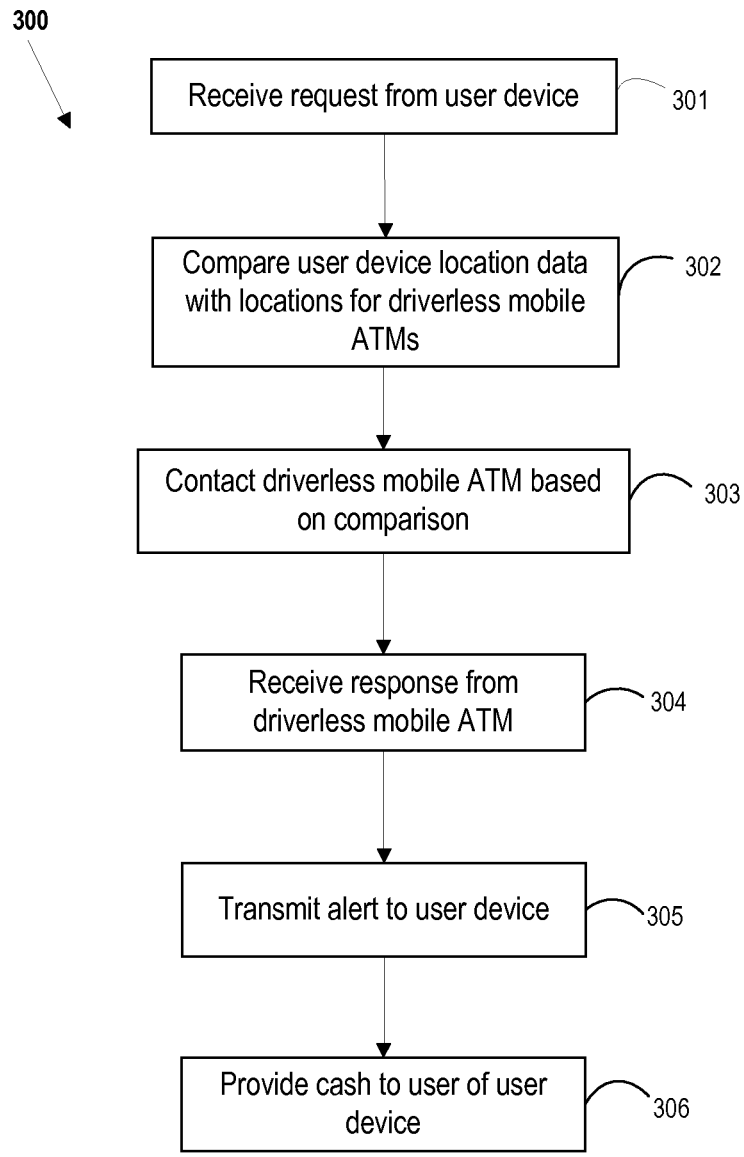
FIG. 3 depicts a schematic diagram of a method for providing a driverless mobile ATM to a user in response to the user's request, according to an example embodiment of the disclosure.

FIG. 3 is a flow chart illustrating an example method 300 for providing a driverless mobile ATM in response to a user request. The method 300 shown in FIG. 3 can be executed or otherwise performed by one or more combinations of various systems. The method 300 as described below may be carried out by the system for providing a driverless mobile ATM, as shown in FIGS. 1 and 2, by way of example, and various elements of that system are referenced in explaining the method of FIG. 3. Each block shown in FIG. 3 represents one or more processes, methods, or subroutines in the example method 300. Referring to FIG. 3, the example method 300 may begin at block 301.

At block 301, a request may be received from a user device. The request may be for a driverless mobile ATM. The request may include location data from the user device, indicating a location where the user of the user device would like to meet the driverless mobile ATM. The request may include an amount of cash that the user would like to withdraw or deposit. The request may include an account number for the user, a name, phone number, email address, and other identifying information for the user. The request may be received electronically over one or more networks. In one example, a user may request to withdraw $40 from a driverless mobile ATM. The user may "drop a pin" at a location on a map interface where the user would like to meet the mobile ATM, and this location data may be provided with the request. The location data may be associated with a shopping mall near the user's house where the user is planning to shop after withdrawing the money. Method 300 may proceed to block 302.

At block 302, the location data from the request may be compared with the location data for one or more driverless mobile ATMs. Each driverless mobile ATM may be a driverless vehicle-based ATM. The driverless mobile ATM may regularly provide its current location to the financial institution. The operating system of the driverless mobile ATM may provide the current location of the vehicle to the financial institution. The financial institution may compare the current location of each driverless mobile ATM within a certain radius of the location data indicated by the request. In this example, the financial institution may determine that the closest driverless mobile ATM (in this example, "Vehicle 1") is 5 miles from the location of the shopping mall. Method 300 may proceed to block 303.

At block 303, the driverless mobile ATM may be contacted based on the results of the comparison. In this example, the financial institution may send an alert to Vehicle 1. The alert may include the request from the user device. The alert may include the location of the shopping mall. The alert may query the driver/operator of Vehicle 1 to confirm that he can make it to the shopping mall and requesting an estimated time. The alert also may include code, e.g., a script, to query a mobile ATM associated with Vehicle 1 to determine whether the mobile ATM has the requested cash for withdrawal. If so, the financial institution may automatically calculate the time it would take for Vehicle 1 to drive to the shopping mall, based on the distance between vehicle 1 and the shopping mall, the time of day, the current traffic conditions, the current weather, the vehicle type of vehicle 1, etc. Method 300 may proceed to block 304.

At block 304, a response may be received from Vehicle 1. The response may be affirmative, indicating that Vehicle 1 has the requisite cash, for example, and will travel to the shopping mall to provide the cash to the user. The response may be negative, indicating that Vehicle 1 cannot make the trip. The response may propose a later time for vehicle 1 to arrive at the shopping mall (e.g., if Vehicle 1 has to make several stops along the way for other customers). In various embodiments, the operating system of the mobile ATM may respond with a proposed alternate location for meeting the user. In this example, Vehicle 1 may respond affirmatively and accept the request. The financial institution may calculate the estimated time for Vehicle 1 to arrive at the shopping mall. Method 300 may proceed to block 305.

At block 305, an alert may be transmitted to the user device. The alert may include a picture of Vehicle 1, the estimated time of Vehicle 1's arrival at the shopping mall, a picture of the driver of vehicle 1, the license plate number of vehicle 1, a map-like interface that allows the user device to see vehicle 1's current location, and a messaging interface that allows user device to communicate directly with Vehicle 1. Method 300 may proceed to block 306.

At block 306, the user of the user device may meet the driverless mobile ATM and withdraw or deposit cash. In this example, the user meets vehicle 1 at the shopping mall and withdraws $40 in cash, in the same way he would using a stationary ATM at a bank.

Figure 4:
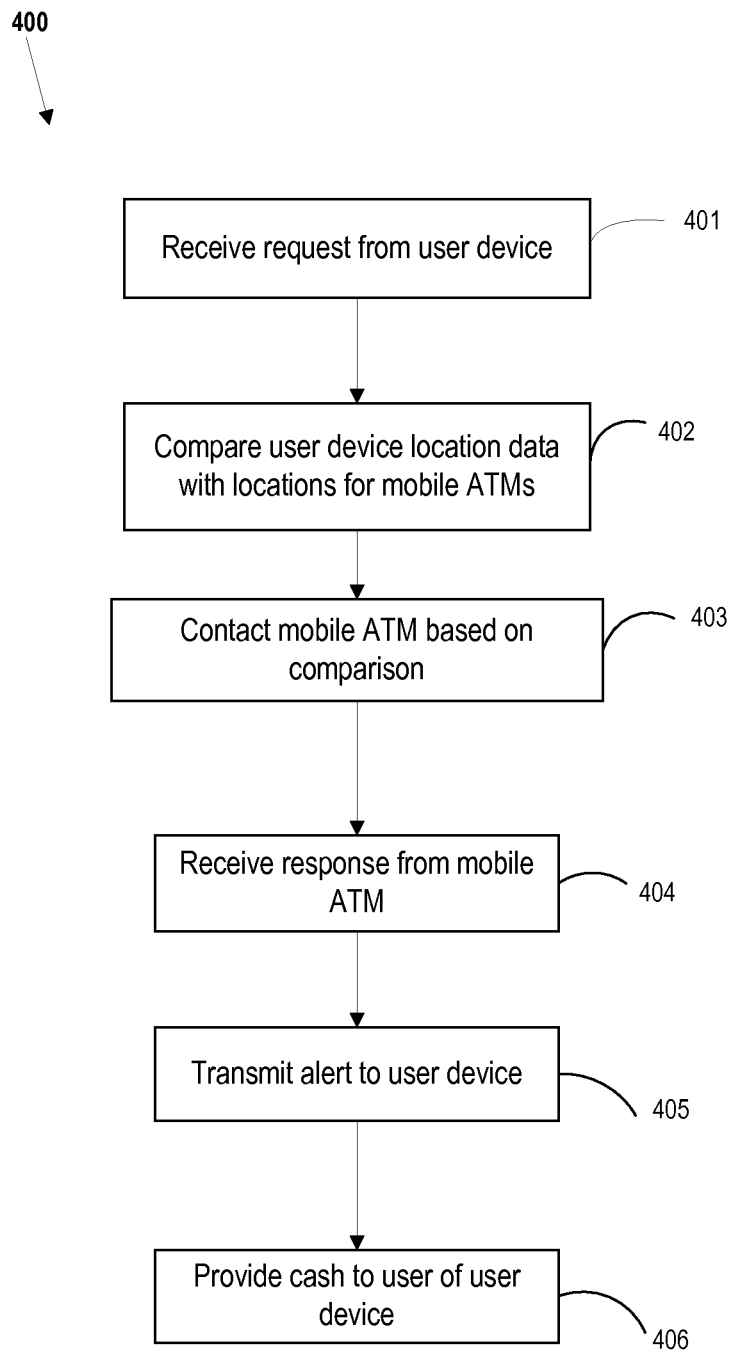
FIG. 4 depicts a schematic diagram of a method for providing a mobile ATM to a user in response to the user's request, according to an example embodiment of the disclosure.

FIG. 4 is a flow chart illustrating an example method for providing a mobile ATM in a vehicle with a driver in response to a user request. The method 400 shown in FIG. 4 can be executed or otherwise performed by one or more combinations of various systems. The method 400 as described below may be carried out by the system for providing a driverless mobile ATM, as shown in FIGS. 1 and 2, by way of example, and various elements of that system are referenced in explaining the method of FIG. 4. Each block shown in FIG. 4 represents one or more processes, methods, or subroutines in the exemplary method 400. Referring to FIG. 4, the exemplary method 400 may begin at block 401.

At block 401, a request may be received from a user device. The request may be for a human-driven mobile ATM. The request may include location data from the user device, indicating a location where the user of the user device would like to meet the human-driven mobile ATM. The request may include an amount of cash that the user would like to withdraw or deposit. The request may include an account number for the user, a name, phone number, email address, and other identifying information for the user. The request may be received electronically over one or more networks. In one example, a user may request to withdraw $40 from a human-driven mobile ATM. In one example, a user may provide location data for the user's current location. The user may be at home and unable to go to a stationary ATM. In another example, the user may "drop a pin" at a location on a map interface where the user would like to meet the human-driven mobile ATM, and this location data may be provided with the request. The location data may be associated with a shopping mall near the user's house where the user is planning to shop after withdrawing the money. Method 400 may proceed to block 402.

At block 402, the location data from the request may be compared with the location data for one or more human-driven mobile ATMs. Each human-driven mobile ATM may be a vehicle-based ATM that is driven by a driver or employee of a financial institution. The driver and/or the operating system of the human-driven mobile ATM may regularly provide its current location to the financial institution. The financial institution may compare the current location of each human-driven mobile ATM within a certain radius of the location data indicated by the request. In this example, the financial institution may determine that the closest human-driven mobile ATM (in this example, "Vehicle 2") is 1 mile from the location of the user's home. Method 400 may proceed to block 403.

At block 403, the human-driven mobile ATM may be contacted based on the results of the comparison. In this example, the financial institution may send an alert to Vehicle 2. The alert may include the request from the user device. The alert may include the location of the user's home. The alert may query the operating system of Vehicle 2 to confirm that it is available to arrive at the user's home and to request an estimated time. The financial institution may automatically calculate the time it would take for Vehicle 2 to drive to the user's home, based on the distance between Vehicle 2 and the user's home, the time of day, the current traffic conditions, the current weather, the vehicle type of Vehicle 2, etc. Method 400 may proceed to block 404.

At block 404, a response may be received from Vehicle 2. The response may be affirmative, indicating that the driver of Vehicle 2 will travel to the user's home to provide the cash to the user and/or allow the user to deposit cash. The response may be negative, indicating that Vehicle 2 cannot make the trip. The response may propose a later time for Vehicle 2 to arrive at the user's home (e.g., if Vehicle 2 has to make several stops along the way for other users). In various embodiments, the driver or operating system of the human-driven mobile ATM may respond with a proposed alternate location for meeting the user. In this example, Vehicle 2 may respond affirmatively and accept the request. The financial institution may calculate the estimated time for Vehicle 2 to arrive at the user's home. Method 400 may proceed to block 405.

At block 405, an alert may be transmitted to the user device. The alert may include a picture of Vehicle 2, the estimated time of Vehicle 2's arrival at the user's home the license plate number of Vehicle 2, a map-like interface that allows the user device to see Vehicle 2's current location, and a messaging interface that allows user device to communicate directly with Vehicle 2. Method 400 may proceed to block 406.

At block 406, the user of the user device may meet the human-driven mobile ATM and withdraw or deposit cash. In this example, the user meets Vehicle 2 at the user's home and deposit $40 in cash, in the same manner a user would use a stationary ATM at a bank.

Additional information relevant to this disclosure is found in Appendix A, the disclosure of which is incorporated herein by reference in its entirety.

It is further noted that the software described herein may be tangibly embodied in one of more physical media, such as, but not limited to, a compact disc (CD), a digital versatile disc (DVD), a floppy disk, a hard drive, read only memory (ROM), random access memory (RAM), as well as other physical media capable of storing software, or combinations thereof. Moreover, the figures illustrate various components (e.g., servers, computers, processors, etc.) separately. The functions described as being performed at various components may be performed at other components, and the various components bay be combined or separated. Other modifications also may be made.

In the preceding specification, various preferred embodiments have been described with references to the accompanying drawings. It will, however, be evident that various modifications and changes may be made thereto, and additional embodiments may be implemented, without departing from the broader scope of the invention as set forth in the claims that follow. The specification and drawings are accordingly to be regarded as an illustrative rather than restrictive sense.

The invention claimed is:

1. An Americans with Disabilities Act (ADA) compliant driverless motor vehicle comprising:
   an driverless mobile automated teller machine (ATM) including a communication interface configured to (i) establish a secure connection with a backend system of a financial institution and (ii) execute a cash withdrawal for a user associated with a user device or receive a deposit of cash or a check from the user;
   a generator;
   a power switchover configured to transition, without electrical interruption, the mobile ATM between receiving power from the generator and receiving power from an electrical grid;
   a dual-band router having a first band configured to communicate via a first mobile internet service provider and a second band configured to communicate via a second mobile internet service provider; and
   a vibration-reduction element,
   wherein the backend system of the financial institution includes:
      a database configured to maintain a status of the driverless mobile ATM, the status of the driverless mobile ATM indicating a current location of the driverless mobile ATM and a current amount of cash available for withdrawal from the driverless mobile ATM;
      a communication interface configured to receive, from the user device and via a network, a request for the driverless mobile ATM, the request including transaction location data indicative of a transaction location at which the driverless mobile ATM is requested to conduct a transaction;
      a location processor configured to compare the transaction location data to the current location of the driverless mobile ATM, and determine whether the driverless mobile ATM is a closest driverless mobile ATM from among a plurality of driverless mobile ATMs to the transaction location, wherein the communication interface is configured to:
         transmit a first alert including the request to the driverless mobile ATM via the network,
         receive a response from the driverless mobile ATM via the network,
         transmit a second alert, to the user device, including a current location of the driverless mobile ATM and an estimated time at which the driverless mobile ATM is estimated to arrive at the transaction location, and
         receive, from the driverless mobile ATM, confirmation that the transaction was completed; and
      a transaction processor configured to process the requested transaction subsequent to receiving the confirmation.

2. The system of claim 1, wherein the request for the driverless mobile ATM is received from a user device executing a banking application associated with the financial institution.

3. The system of claim 2, wherein the communication interface is configured to transmit, to the banking application, the second alert from the communication interface of the financial institution.

4. The system of claim 3, wherein the communication interface is configured to receive, from the banking application, a user confirmation indicating that the transaction was completed.

5. The system of claim 1, wherein the generator is separate from the motor vehicle.

6. The system of claim 1, wherein the transaction device location data includes global positioning system (GPS) information.

7. The system of claim 6, wherein the GPS information is derived from location services executed by the user device.

8. The system of claim 1, wherein each driverless mobile ATM of the plurality of driverless mobile ATMs is associated with a mobile ATM application configured to provide status updates corresponding to the respective driverless mobile ATM.

9. The system of claim 8, wherein each status update includes a location of a corresponding driverless mobile ATM, the location including global positioning system (GPS) information indicating a location of the corresponding driverless mobile ATM.

10. The system of claim 1, wherein each driverless mobile ATM of the plurality of driverless mobile ATMs is configured to transmit communications to, and receive communications from, the backend system of financial institution via a secure communication channel.

11. The system of claim 1, wherein, to compare the transaction location data to the location of each driverless mobile ATM, the location processor determines whether a location associated with the transaction location data is within a predetermined range of the corresponding location of each driverless mobile ATM of the plurality of driverless mobile ATMs.

12. The system of claim 11, wherein the location processor determines that the driverless mobile ATM is closer to the location associated with the transaction location data than all other driverless mobile ATMs of the plurality of driverless mobile ATMs that are within the predetermined range.

* * * * *